US012631048B2

(12) United States Patent
Chen

(10) Patent No.: US 12,631,048 B2
(45) Date of Patent: May 19, 2026

(54) HIDDEN MAGNETIC CONTROL LOCK

(71) Applicant: DONGGUAN YEXIN FURNITURE SALES CO., LTD, Dongguan (CN)

(72) Inventor: Zhipeng Chen, Dongguan (CN)

(73) Assignee: DONGGUAN YEXIN FURNITURE SALES CO., LTD, Dongguan (CN)

( * ) Notice: Subject to any disclaimer, the term of this patent is extended or adjusted under 35 U.S.C. 154(b) by 45 days.

(21) Appl. No.: 18/794,451

(22) Filed: Aug. 5, 2024

(65) Prior Publication Data

US 2026/0028856 A1 Jan. 29, 2026

(30) Foreign Application Priority Data

Jul. 23, 2024 (CN) ......................... 202410993873.0

(51) Int. Cl.
*E05B 47/00* (2006.01)
*E05B 65/52* (2006.01)

(52) U.S. Cl.
CPC ...... *E05B 47/0045* (2013.01); *E05B 65/5215* (2013.01)

(58) Field of Classification Search
CPC ......................... E05B 47/0045; E05B 65/5212
USPC ........................................................... 70/276
See application file for complete search history.

(56) References Cited

U.S. PATENT DOCUMENTS

| | | | | |
|---|---|---|---|---|
| 3,948,068 | A * | 4/1976 | Stackhouse | E05B 47/0041 70/276 |
| 8,087,269 | B2 * | 1/2012 | Conti | E05B 45/005 70/57.1 |
| 11,530,554 | B2 * | 12/2022 | Tubby | E05B 15/1607 |
| 2013/0025510 | A1 * | 1/2013 | White | E05G 1/026 109/51 |
| 2020/0253407 | A1 * | 8/2020 | Noorkõiv | G07C 9/27 |

FOREIGN PATENT DOCUMENTS

| | | | | |
|---|---|---|---|---|
| CN | 107829615 A | * | 3/2018 | E05B 65/46 |
| CN | 220653744 U | * | 3/2024 | |
| ES | 2768077 T3 | * | 6/2020 | E05B 47/0045 |

* cited by examiner

*Primary Examiner* — Nathan Cumar
(74) *Attorney, Agent, or Firm* — Birchwood IP

(57) ABSTRACT

The present disclosure provides a hidden magnetic control lock, including a lock pin assembly, a lock body and a key assembly, where a first magnetic body is provided on the lock pin; the lock body includes a lock body housing, a lockup member, a moving member and a fixed member fixedly connected in the lock body housing, a first connecting hole, in which the lock pin is plugged, is provided on the lock body housing, the lockup member is stretchably mounted on the fixed member, the lockup member is disposed below the first connecting hole and abuts against the plugged lock pin, a first adsorption member capable of adsorbing in cooperation with a magnetic force is fixedly connected to the moving member, and the moving member and the lockup member are provided with locking structures that cooperate with each other.

20 Claims, 14 Drawing Sheets

HIDDEN MAGNETIC CONTROL LOCK

CROSS-REFERENCE TO RELATED APPLICATIONS

This application claims priority to Chinese Patent Application No. 202410993873.0, filed on Jul. 23, 2024, which is hereby incorporated by reference in its entirety.

TECHNICAL FIELD

The present disclosure relates to the technical field of locks, and in particular to a hidden magnetic control lock.

BACKGROUND

Gift box packaging will be generally adopted when presenting a gift, the packaging mode for the gift box not only highlights the importance of the giver to the receiver, but also enhances the degree of refinement and sense of grade of the presented product, and therefore the packaging mode has become more and more popular in the market. The lock mounted in the high-end gift box is not only a simple decoration, providing actual safety protection and increasing the sense of worth and sense of ceremony of the gift, but also helps improve the brand image and market value; and the gift box lock is not just a safety measures, and also increases the sense of luxury and degree of refinement visually. However, the current lock body is generally provided with a key hole, and the arrangement of the key hole affects the overall beauty, has a certain influence on the beauty of the gift box, and is not conductive the appearance design of the gift box. Furthermore, the current unlocking mode is too simple and lacks interestingness.

SUMMARY

The objective of the present disclosure is to overcome the above-mentioned defects in the prior art and provide a hidden magnetic control lock, the hidden magnetic control lock can be mounted on a gift box in a completely hidden manner, a key hole is not required, thus not affecting the appearance of the gift box, and adopting magnetic unlocking can increase gift-giving interaction and improve the interestingness.

To achieve the above-mentioned objective, the present disclosure provides a hidden magnetic control lock, including:

- a lock pin assembly, where the lock pin assembly includes a lock pin base, the lock pin base is connected with a lock pin, and a first magnetic body is provided on the lock pin;
- a lock body, where the lock body includes a lock body housing, a lockup member, a moving member and a fixed member fixedly connected in the lock body housing, a first connecting hole, in which the lock pin is plugged, is provided on the lock body housing, the lockup member is stretchably mounted on the fixed member, and the lockup member is disposed below the first connecting hole and abuts against the plugged lock pin; and the other end of the fixed member that is relative to the lockup member is provided with a first moving shaft, the moving member is sleeved on the first moving shaft, a first adsorption member capable of adsorbing in cooperation with a magnetic force is fixedly connected to the moving member, and the moving member and the lockup member are provided with locking structures that cooperate with each other; and
- a key assembly, where a second magnetic body is provided on the key assembly, and a magnetic force of the second magnetic body is greater than that of the first magnetic body.

Further, each of the locking structures include a snap pin provided on the moving member, and a first lockup hole provided on the lockup member; and the snap pin cooperates with the first lockup hole to lock the lockup member. Setting the snap pin can enable the moving member to move when subjected to the magnetic suction of the first magnetic body, to lock the lockup member, making the lockup member not stretch, thus locking the lock pin.

Further, a first through hole, passing through the snap pin, is provided on the fixed member. Setting the first through hole can play a role in limiting and guiding the snap pin.

Further, the lockup member includes a first elastic member as well as a lockup portion and a linkage arm that are connected in turn, the first lockup hole is provided on the lockup portion, a joint between the lockup portion and the linkage arm is provided with a stop protrusion, the first elastic member is provided on the linkage arm, a second moving shaft is provided on the fixed member, and one side of the linkage arm that is away from the lockup portion is sleeved on a second moving shaft. Setting the first elastic member enables the lockup member to have a retractable reset power, thus achieving a retractable action of the lockup member along the second moving shaft.

Further, the linkage arm includes a first upper arm and a first lower arm, a mounting clearance is provided between the first upper arm and the first lower arm, one end of the first elastic member is mounted on the mounting clearance, a mounting cylinder is provided on the fixed member, and the other end of the first elastic member is connected with the mounting cylinder. Mounting the first elastic member on the mounting clearance not only can protect the first elastic member, but also can save the internal space and improve the use ratio of the internal space.

Further, the first elastic member includes a first connecting arm, a second connecting arm and a torsional spring ring connected with the first connecting arm and the second connecting arm, one end of the stop protrusion extends to one side of the linkage arm such that the stop protrusion is connected with the mounting clearance, a first mounting slot is provided on the mounting cylinder, one end of the first upper arm that is away from the lockup portion and one end of the first lower arm that is away from the lockup portion are provided with a second connecting hole and a third connecting hole in respective, the torsional spring ring is worn between the second connecting hole and the third connecting hole, and the first upper arm, first lower arm and first elastic member are worn on the second moving shaft through the second connecting hole, third connecting hole and torsional spring ring; and the second connecting arm is plugged into the first mounting slot, and the first connecting arm passes through the mounting clearance and abuts against the stop protrusion. The torsional spring ring, the second connecting hole and the third connecting hole are worn on the second moving shaft together such that the first elastic member and the lockup member can be coaxial, the first connecting arm and the second connecting arm abut against the stop protrusion and the mounting cylinder in respective, thus a thrust can be kept for the stop protrusion through itself elasticity of the torsional spring ring, allowing the stop protrusion to keep the resisting connection to the axes of the first lockup hole, and when the lock pin is plugged, the stop protrusion is in resisting connection with the lock pin all the time.

Further, a second through hole that fits with the first connecting hole in position is provided on the fixed member, upward stretching is carried out around the second through hole to form a first limiting edge for limiting the lockup member, and a second mounting slot that passes through the stop protrusion is provided on the first limiting edge. Axial stretching of the lockup member can be limited through the first limiting edge, to avoid an excessive displacement affecting the whole lockup operation, and and the second mounting slot fits with the stop protrusion to lock the lock pin.

Further, a side wing of the moving member is provided with a connecting lug, a fourth connecting hole is provided on the connecting lug, and the fourth connecting hole is worn on the first moving shaft. Setting the connecting lug to be connected with the first moving shaft enables the moving member to make a free reciprocating motion along the first moving shaft, thus performing a lockup action.

Further, a buffer spring is provided on the first moving shaft. Setting the buffer spring can protect the moving member and the fixed member, to avoid directly colliding and damaging the moving member and the fixed member when absorbing the first magnet.

Further, the other end of the moving member that is in relative to the snap pin is provided with a first mounting cavity, the first absorption member is disposed in the first mounting cavity, outward raising is carried out around the first mounting cavity to form a protection edge, the protection edge is slightly higher than the first absorption member, and a first opening is provided on the protection edge. Mounting the first absorption member in the first mounting cavity can ensure that the moving member can move with the attraction to the first absorption member by the first magnetic body/second magnetic body, and ensure the lockup operation to the lockup member by the moving member, and arranging the first opening can facilitate the mounting and disassembly of the first absorption member.

Further, sections of the first lockup hole, snap pin and first through hole are all square, inlet ends of the first lockup hole and the first through hole are provided with a first circular arc introduction portion and a second circular arc introduction portion in respective, an end part of the snap pin is provided with an upward protrusion portion, and the protrusion portion is a circular arc protrusion. Structures of square blocks and square holes can ensure that parts are accurately aligned and positioned when being connected. This design can prevent the parts from rotating or moving in relative to each other, to ensure the assembly accuracy and stability, and the structures of the square blocks and square holes provide a relatively big connecting area, thus providing a better strength and stability; and the protrusion portion provided with the circular arc not only can improve the plugging accuracy but also can protect the snap pin.

Further, stretching in the lock body housing around the first connecting hole forms a second limiting edge, a third mounting slot is provided on the second limiting edge, the second limiting edge fits with the first limiting edge in position and abuts against each other, such that the second mounting slot communicates with the third mounting slot to form a passage, into which the stop protrusion can stretch. The second limiting edge abuts against the first limiting edge to constitute a closed limiting structure, which can effectively limit the lockup member, thus not affecting the lockup action to the lock pin due to skipping when subjected to an external collision; and the second mounting slot and the third mounting slot form the passage of the stop protrusion, to ensure the normal lockup action to the lock pin by the lockup member.

Further, the lock body housing further includes a lock body rear cover and a first fixed screw, a first fixed cylinder is provided on the lock body rear cover, the first fixed cylinder is a hollow cylinder, a first mounting hole fitting with the first fixed cylinder is provided on an inner wall of the lock body housing, a second mounting hole fitting with the first fixed cylinder is provided on the fixed member, and after passing through the second mounting hole, the first fixed cylinder is connected with the first mounting hole through the first fixed screw. The first fixed cylinder provided on the lock body rear cover can limit the moving member and fix the fixed member, to ensure the assembly stability of the moving member and the fixed member, and avoid the influence from an external force.

Further, an inner groove fitting with the first fixed cylinder is disposed around the moving member, and the moving member is clamped between the lock body rear cover and the fixed member through the inner groove. The moving member can be limited between the first fixed cylinders by arranging the inner groove, and left and right limiting actions are formed for the moving member under a premise of not affecting the axial movement of the moving member.

Further, the first absorption member is a magnet, and the other end of the lock body rear cover that is in relative to the first fixed cylinder is provided with a second absorption member. When not working, the second absorption member disposed on the lock body rear cover can fit with the first absorption member to absorb the moving member to be away from the fixed member, such that the moving member will not lock the lockup member, facilitating the plugging of the lock pin.

Further, the other end of the lock body rear cover that is in relative to the first fixed cylinder is provided with a fourth mounting slot, a clamping member is provided around the fourth mounting slot, and the second absorption member is mounted in the fourth mounting slot through the clamping member. The second absorption member is mounted on the lock body rear cover through the clamping member, facilitating the mounting and disassembly of the second absorption member.

Further, a positioning bump is provided inside the lock body housing, and a positioning slot fitting with the positioning bump is provided on the fixed member. When in assembly, further limiting of the fixed member can be achieved, to avoid the shaking of the fixed member affecting the lockup operation.

Further, the lock pin assembly further includes the lock pin that is removably connected with the lock pin base, the lock pin stretches downward to form a locking portion, an indented locking slot body is provided on the locking portion, and the size of the locking slot body fits with the stop protrusion. A split structure is adopted for ease of mounting and disassembly maintenance, and adopting the locking slot body with the indented circular arc structure can increase the smoothness between the locking portion and the stop protrusion when the locking portion is plugged, without appearing the phenomenon of being stuck.

Further, a second mounting cavity is arranged in the lock pin, and the first magnetic body is mounted in the second mounting cavity, which facilitates the mounting and disassembly of the first magnetic body.

Further, the key assembly includes a key housing and a key outer cover that are in removable connection, a third mounting cavity is formed on the key housing, and the second magnetic body is mounted in the third mounting cavity, which facilitates the mounting and disassembly of the second magnetic body.

Compared with the prior art, the present disclosure has the following advantages: the axial movement can be carried out on the moving member along the first moving shaft in the present disclosure, the snap pin and the first absorption member are disposed on the moving member, when the lock pin of the lock pin assembly is plugged into the first lockup hole, the stop protrusion of the lockup member will get into the locking slot body of the locking portion under the action of the torsional spring ring, and at the same time absorb the first absorption member under the magnetic force action of the first magnetic body; the moving member moves to the lock pin direction under the drive of the first absorption member, the snap pin will be plugged into the first lockup hole of the lockup member with the movement of the moving member to lock the lockup member, making the lockup member not stretch or separate from the locking slot body, that is, the locking of the lock pin can be achieved; when unlocking is required, the key assembly approaches to the lock body outer cover, at this time the first absorption member will drive the moving member to move to the key assembly direction since the magnetic force of the second magnetic body is greater than that of the first magnetic body; and meanwhile the snap pin is separated from the first lockup hole, the lockup member is unlocked, the lockup member stretches as far as possible, and then the lock pin assembly is pulled out. In the present disclosure, different magnetic forces of lock pin assembly and key assembly are adopted to absorb the moving member inside the lock body, thus achieving the opening and closing actions of the lock body, complete hidden mounting can be achieved, and the key hole is not required to be provided on the lock body any more, thus the lock body can be ignored when designing the gift box, to implement the more complete and beautiful design; and furthermore, when unpacking the box body, friends can show the unlocking action in an interesting manner, to promote the communication between the friends.

BRIEF DESCRIPTION OF DRAWINGS

To better clarify the embodiments of the present disclosure or the technical solution in the prior art, the drawings required to illustrate the embodiments or the prior art will be simply described below. It is apparent that the drawings described below are merely some embodiments of the present disclosure. Those ordinarily skilled in the art can obtain other drawings according to these drawings without contributing creative labor on the basis of those drawings.

In the drawings.

Figure 1:
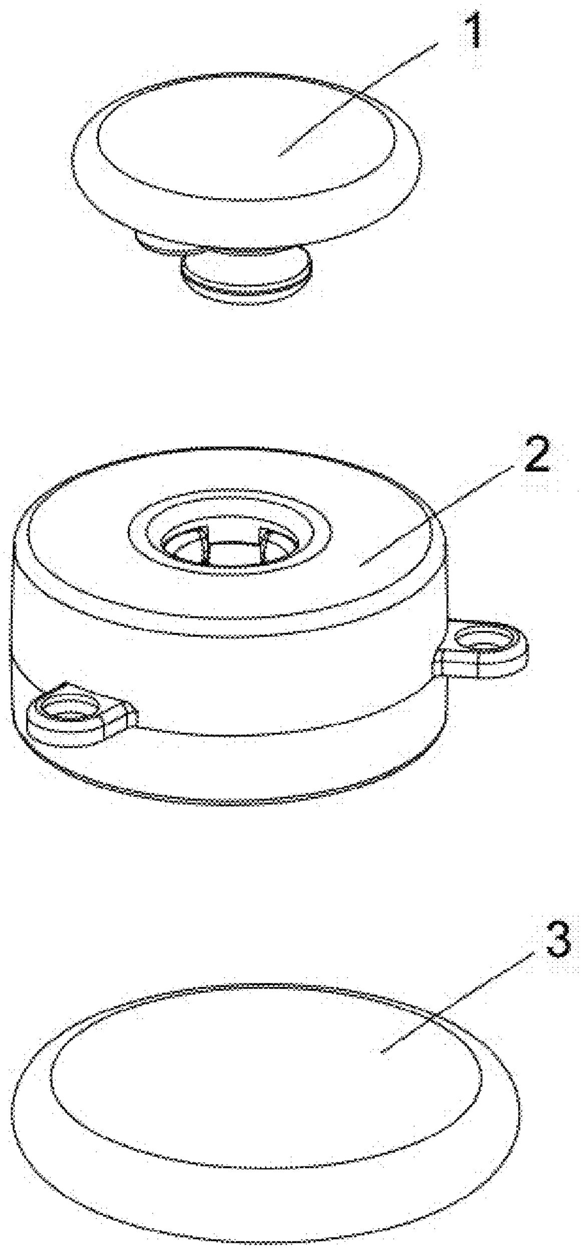
FIG. 1 is a structural schematic diagram of a hidden magnetic control lock according to the present disclosure.

1. Lock pin assembly; 11. Lock pin base; 111. Pressing member; 12. Lock pin; 121. Locking portion; 122. Locking slot body; 123. Second mounting cavity; 124. Fixed lug; 125. Screw hole; 13. First magnetic body; 2. Lock body; 21. Lock body housing; 211. First connecting hole; 212. Second limiting edge; 123. Third mounting slot; 214. Lock body rear cover; 2141. First fixed cylinder; 2142. Fourth mounting slot; 2143. Clamping member; 215. Positioning bump; 216. First mounting hole; 22. Lockup member; 222. First elastic member; 2221. First connecting arm; 2222. Second connecting arm; 2223. Torsional spring ring; 223. Lockup portion; 2231. Stop protrusion; 2232. First lockup hole; 22321. First circular arc introduction portion; 224. Linkage arm; 2241. First upper arm; 22411. Second connecting hole; 2242. First lower arm; 22421. Third connecting hole; 2243. Mounting clearance; 23. Moving member; 231. Snap pin; 2311. Protrusion portion; 232. First absorption member; 233. Connecting lug; 2331. Fourth connecting hole; 234. First mounting cavity; 2341. Protection edge; 2342. First opening; 235. Inner groove; 24. Fixed member; 241. Second through hole; 242. Second moving shaft; 243. Mounting cylinder; 2431. First mounting slot; 244. First through hole; 244. Second circular arc introduction portion; 245. First limiting edge; 2451. Second mounting slot; 246. First moving shaft; 247. Second elastic member; 248. Second mounting hole; 249. Positioning slot; 3. Key assembly; 31. Second magnetic body; 32. Key housing; 321. Third mounting cavity; 33. Key outer cover; 4. Second absorption member; 5. First fixed screw.

DETAILED DESCRIPTION OF THE EMBODIMENTS

The technical solution in the embodiments of the present disclosure is clearly and completely elaborated below in combination with the drawings in the embodiments of the present disclosure. It is apparent that the described embodiments are only a part of the embodiments of the present disclosure but not all. Based on the embodiments of the present disclosure, all the other embodiments obtained by those of ordinary skill in the art on the premise of not contributing creative effort should belong to the protection scope of the present disclosure.

It is to be noted that all directional indication (such as: upper, lower, left, right, front, rear, etc.) in the embodiments of the present disclosure is merely used to explain the relative position relation, movement and the like of various components under a certain special posture (as shown in the drawings); and if the special posture is changed, the directional indication will change accordingly.

In addition, if the descriptions "first", "second" and the like are involved in the embodiments of the present disclosure, the descriptions "first", "second" and the like are merely used for description, instead of being understood as indicating or implying relative importance or impliedly indicating the quantity of the showed technical features.

Figure 2:
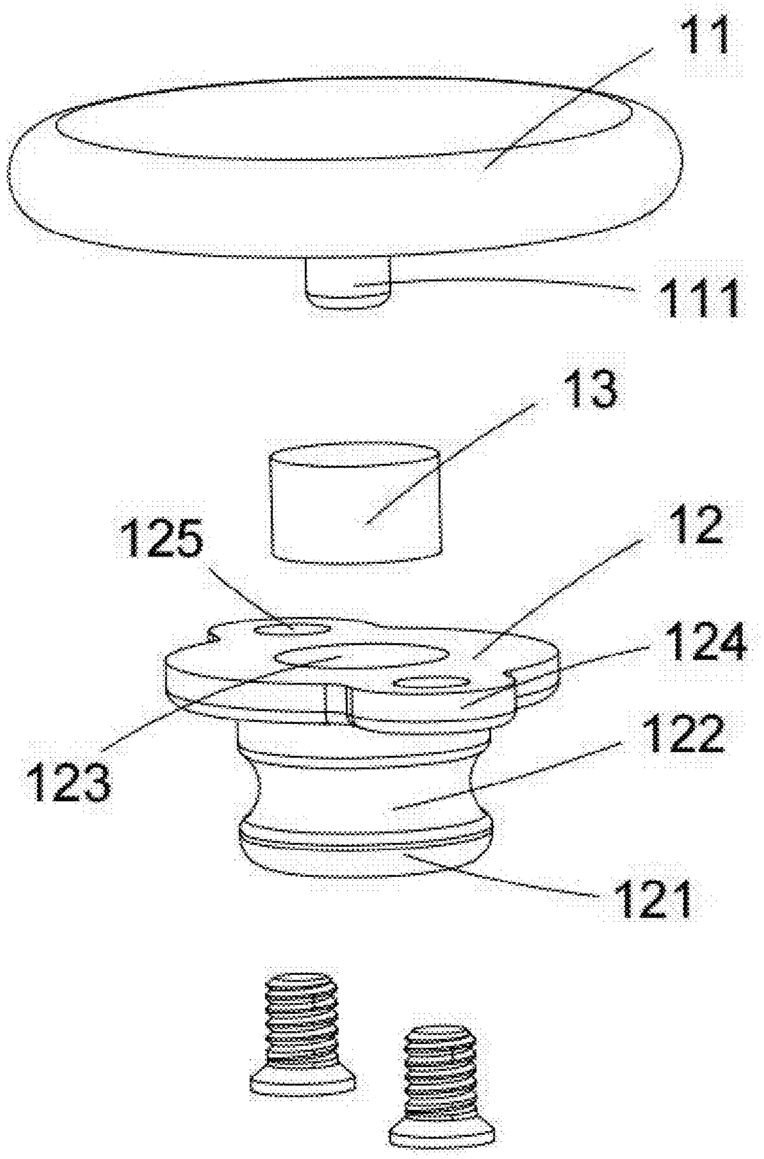
FIG. 2 is an exploded diagram of a lock pin assembly according to the present disclosure.

Please refer to FIG. 1 to FIG. 14, embodiments of the present disclosure provide a hidden magnetic control lock, including a lock pin assembly 1, a lock body 2 and a key assembly 3;

Please refer to FIG. 1 and FIG. 2, the lock pin assembly 1 includes a lock pin base 11 and a lock pin 12 that are removably connected, the split structure is adopted for ease of mounting and disassembly maintenance, a first magnetic body 13 is disposed on the lock pin 12, the first magnetic body 13 may be a magnet, a permanent magnet or other magnetic members with magnetism, specifically the above-mentioned lock pin 12 stretches downward to form a locking portion 121, an in indented locking slot body 122 is provided on the locking portion 121, the whole locking slot body 122 is a circular arc structure, a lower side edge of the locking slot body 122 is a round chamfer, facilitating the cooperation during plugging and locking without damaging other parts, thus increasing the smoothness of plugging the locking portion 121, and not appearing the phenomenon of being stuck. To further achieve the mounting protection for the first magnetic body 13, in this embodiment, a second mounting cavity 123 is disposed in the lock pin 12, the first magnetic body 13 is mounted in the second mounting cavity 123, a pressing member 111 for pressing the first magnetic body 13 is disposed on the lock pin base 11, stretching is carried out on both sides of the lock pin 12 to form two fixed lugs 124, screw holes 125 are provided on the fixed lugs 124, the lock pin base 11 is fixedly connected with the lock pin 12 through a screw after the first magnetic body 13 is mounted in the second mounting cavity 123, and the pressing member 111 will resist to an upper surface of the first magnetic body 13, such that the first magnetic body 13 is placed in the second mounting cavity 123 without occurring a position offset.

Figure 3:
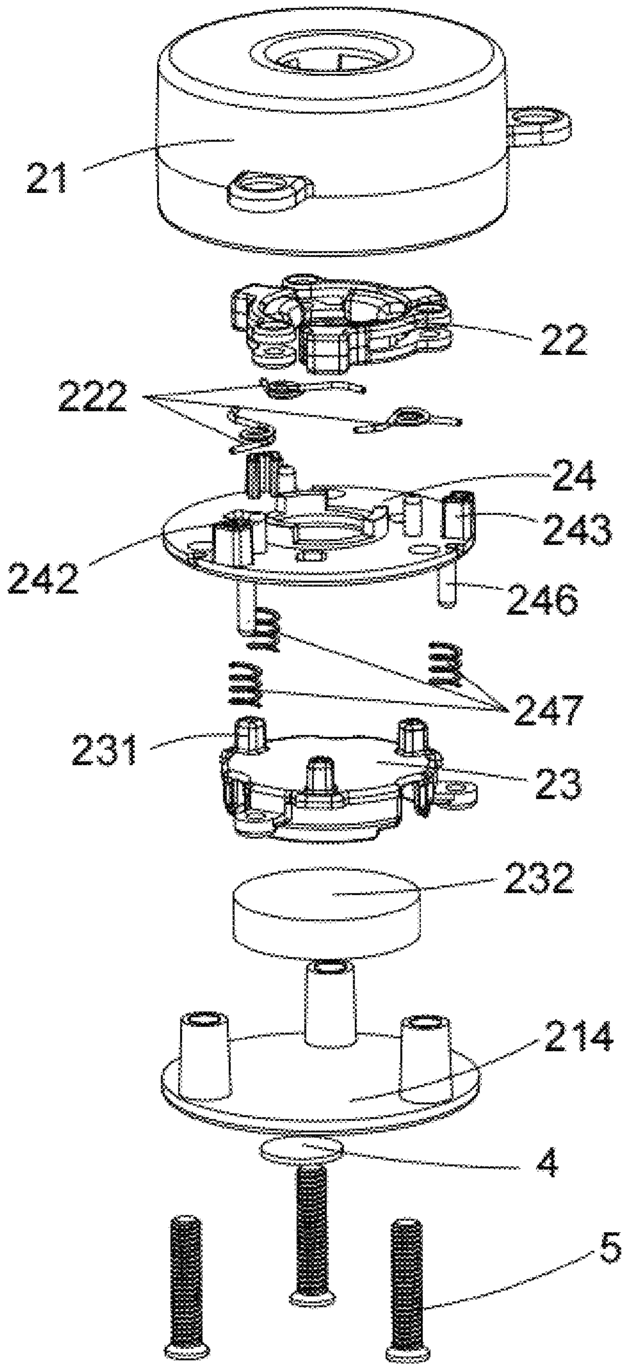
FIG. 3 is an exploded diagram of a lock body according to the present disclosure.
Figure 5:
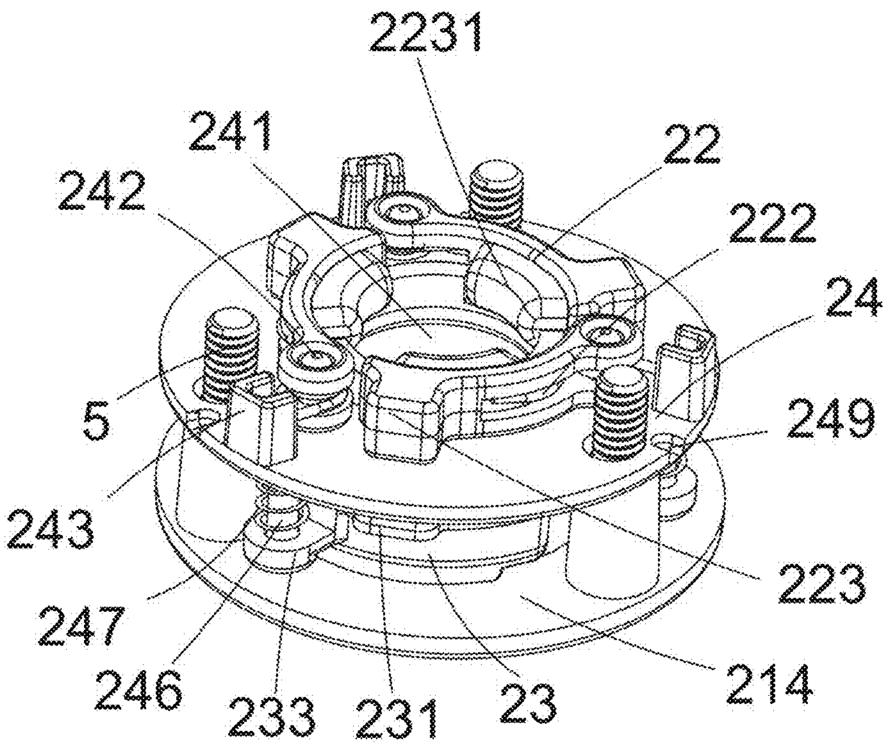
FIG. 5 is a structural schematic diagram of a lock body hiding a lock body housing according to the present disclosure.

As shown in FIG. 3 and FIG. 5, the lock body 2 includes a lock body housing 21, a lockup member 22, a moving member 23 and a fixed member 24 fixedly connected in the lock body housing 21, a first connecting hole 211, in which the lock pin 12 is plugged, is provided on the lock body housing 21, the fixed member 24 is provided with a second through hole 241 fitting with the first connecting hole 211 in position, the lockup member 22 is stretchably mounted on the fixed member 24, and the lockup member 22 is placed below the first connecting hole 211 and abuts against the plugged lock pin 12; and as shown in FIG. 5, a total of three sets of lockup members 22 are provided in this embodiment, these three sets of lockup members 22 are disposed around the second through hole 241, and the quantity of the lockup member 22 may be set according to actual needs, and specific limitations are not made here.

Figure 6:
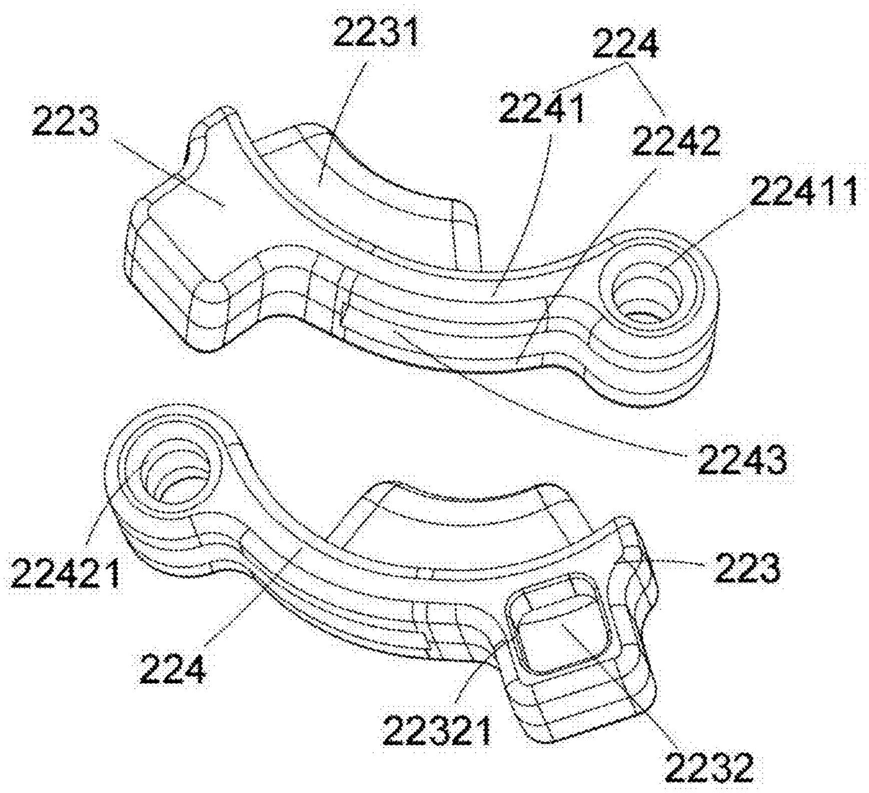
FIG. 6 is a structural schematic diagram of a lockup member according to the present disclosure.
Figure 9:
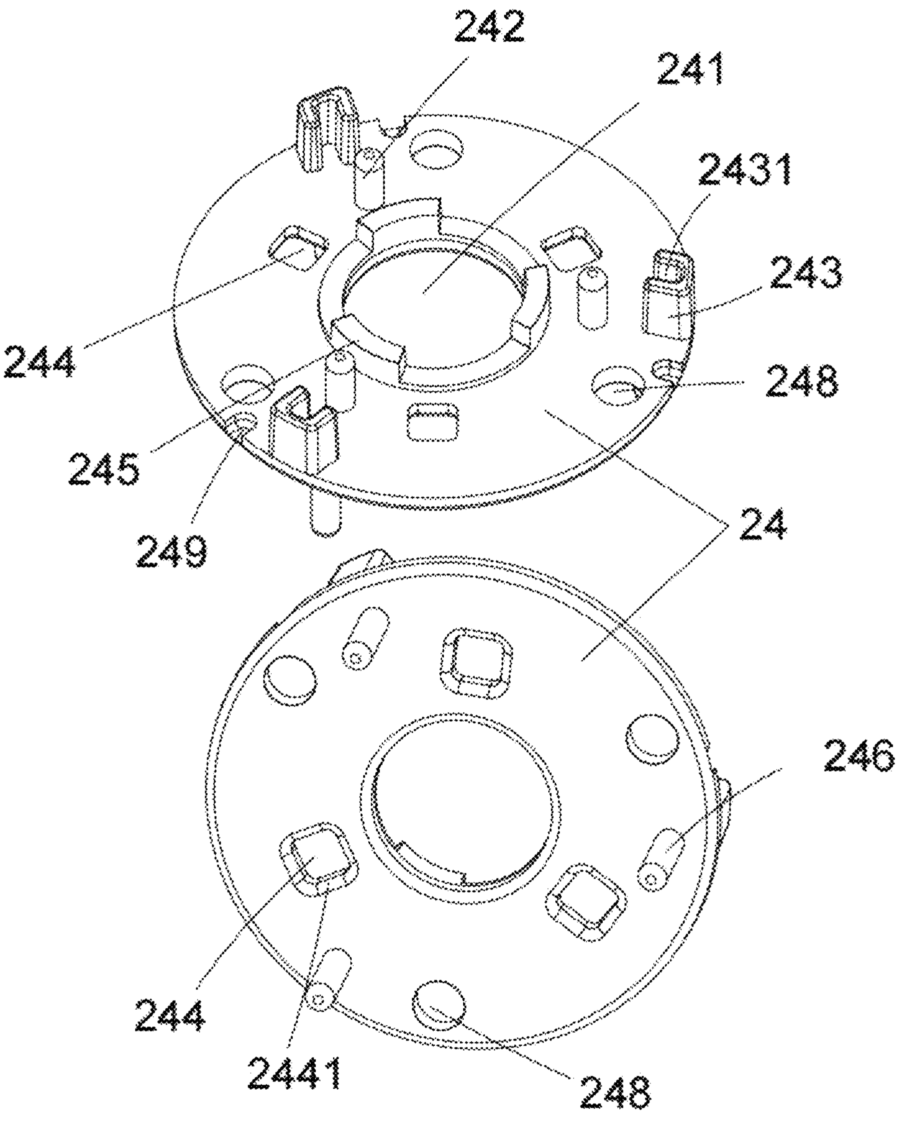
FIG. 9 is a structural schematic diagram of a fixed member according to the present disclosure.
Figure 10:
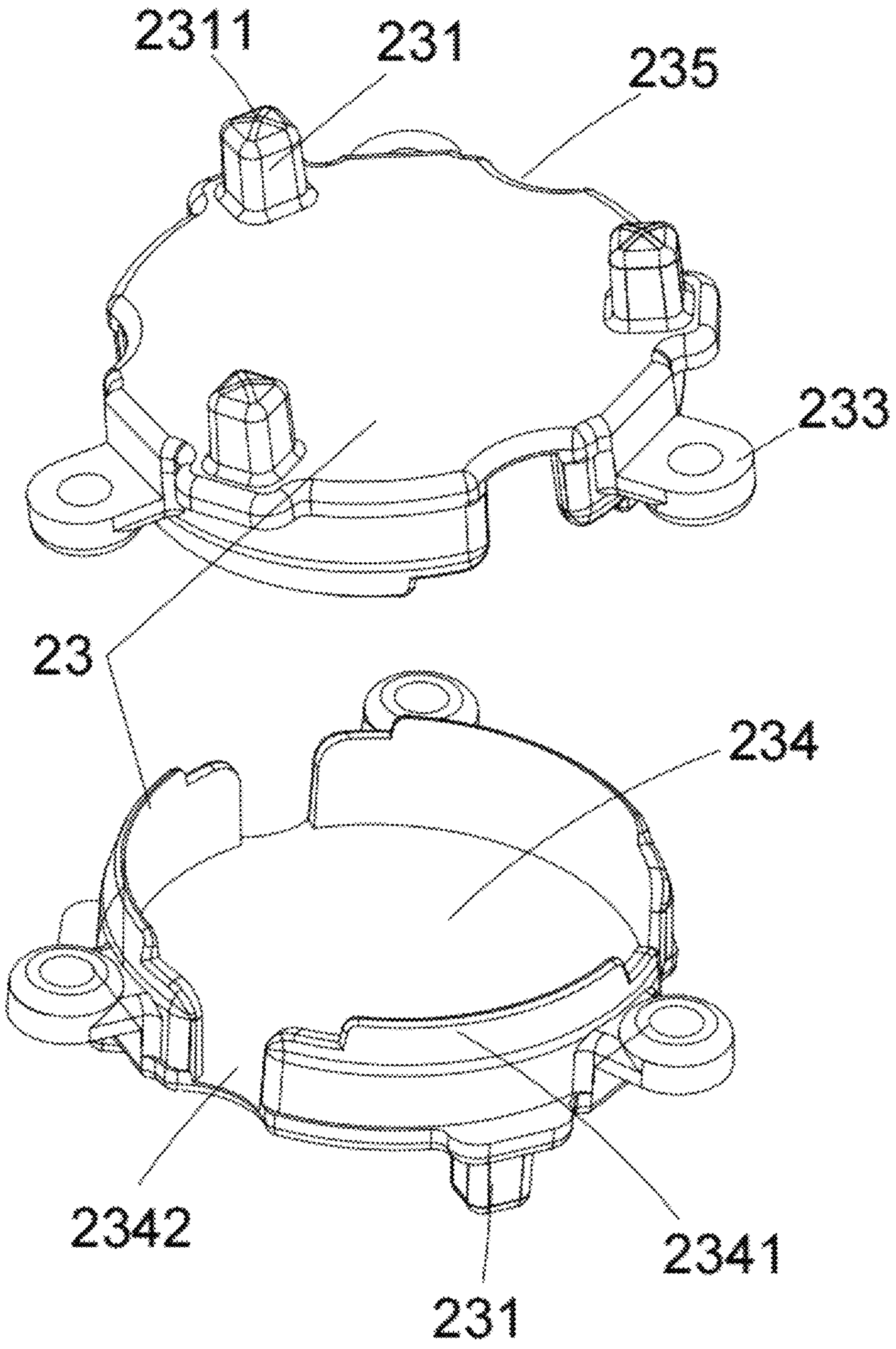
FIG. 10 is a structural schematic diagram of a moving member according to the present disclosure.
Figure 11:
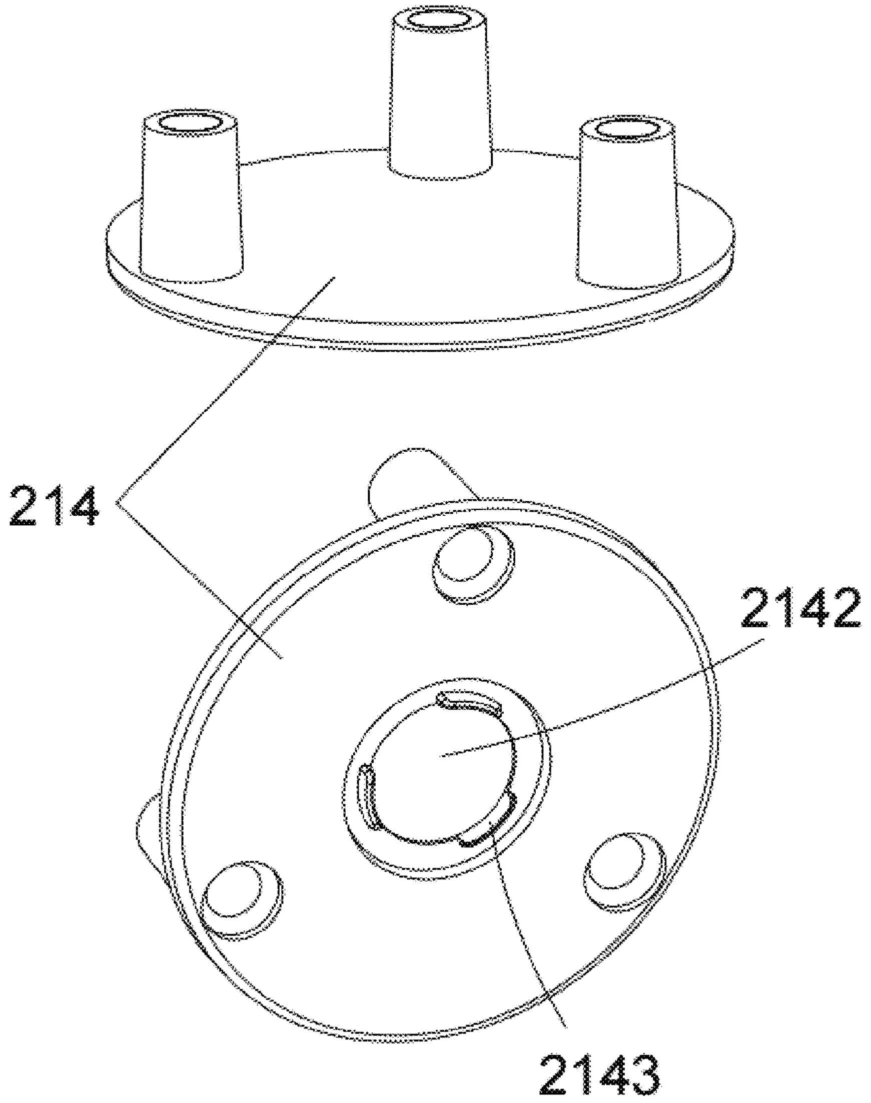
FIG. 11 is a structural schematic diagram of a lock body rear cover according to the present disclosure.

As shown in FIG. 6, FIG. 9 and FIG. 10, the moving member 23 and the lockup member 22 are provided with locking structures that cooperate with each other, each of the locking structures includes a snap pin 231 provided on the moving member 23, and a first lockup hole 2232 provided on the lockup member 22; the snap pin 231 cooperates with the first lockup hole 2232 to lock the lockup member 22; to cooperate with the plugging of the snap pin 231 and the first lockup hole 2232, in this embodiment, a first through hole 244 passing through the snap pin 231 is provided on the fixed member 24, so the working snap pin 231 passes through the first through hole 244 first and then is plugged into the first lockup hole 2232 for clamping, and the first through hole 244 can play a better guide role; and in addition, preferably, sections of the first lockup hole 2232, snap pin 231 and first through hole 244 are all square in this embodiment, inlet ends of the first lockup hole 2232 and the first through hole 244 are provided with a first circular arc introduction portion 22321 and a second circular arc introduction portion 2441 in respective, an end part of the snap pin 231 is provided with an upward protrusion portion 2311, and the protrusion portion 2311 is a circular arc protrusion. Structures of square blocks and square holes can ensure that parts are accurately aligned and positioned when being connected. This design can prevent the parts from rotating or moving in relative to each other, to ensure the assembly accuracy and stability, and the structures of the square blocks and square holes provide a relatively big connecting area, thus providing a better strength and stability; and the circular arc protrusion portion 2311 provided on the snap pin 231 not only can improve the plugging accuracy but also can protect the snap pin 231 from being easily collided and damaged.

Figure 7:
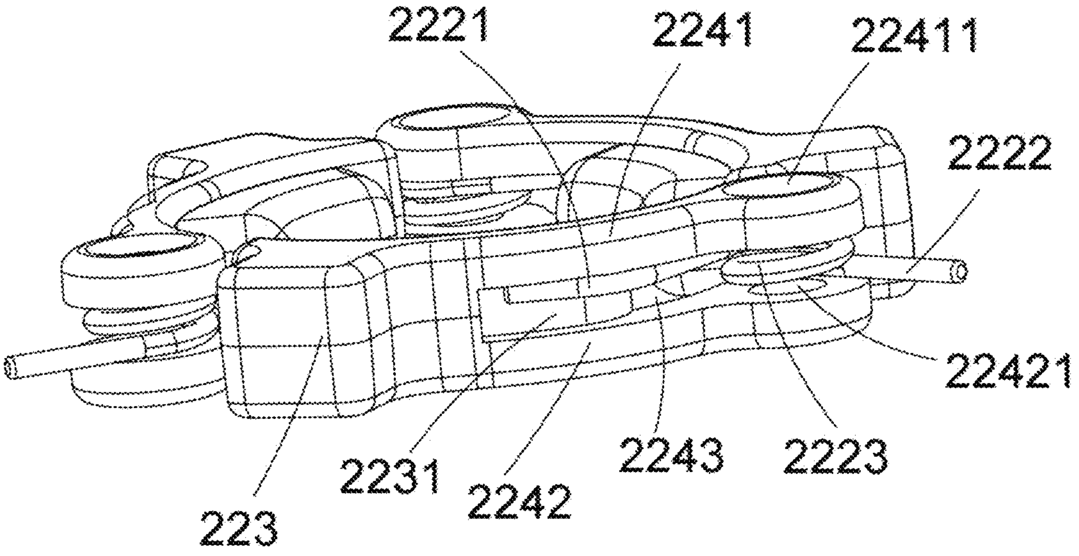
FIG. 7 is an assembly schematic diagram of a lockup member and a first elastic member according to the present disclosure.
Figure 8:
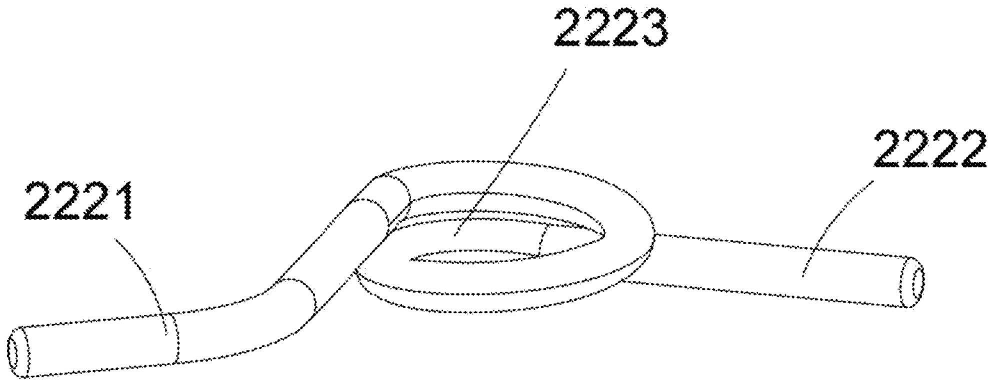
FIG. 8 is a structural schematic diagram of a first elastic member according to the present disclosure.

As shown in FIG. 3 to FIG. 7, in this embodiment, the lockup member 22 includes a first elastic member 222 as well as a lock portion 223 and a linkage arm 224 that are connected in turn, the first lockup hole 2232 is provided on the lockup portion 223, the linkage arm 224 includes a first upper arm 2241 and a first lower arm 2242, a mounting clearance 2243 is provided between the first upper arm 2241 and the first lower arm 2242, and one end of the first elastic member 222 is mounted on the mounting clearance 223. As shown in FIG. 7, a second moving shaft 242 is provided on the fixed member 24, one side of the linkage arm 224 that is away from the lockup portion 223 is sleeved on the second moving shaft 242, a mounting cylinder 243 is provided on the fixed member 24, the other end of the first elastic member 222 that is away from the mounting clearance 2243 is connected with the mounting cylinder 243, a joint between the lockup portion 223 and the linkage arm 224 is provided with a stop protrusion 2231, and in this embodiment, the specific assembly structure of the first elastic member 222, linkage arm 224 and mounting cylinder 243 is as follows: the first elastic member 222 includes a first connecting arm 2221, a second connecting arm 2222 and a torsional spring ring 2223 that is connected with the first connecting arm 2221 and the second connecting arm. As shown in FIG. 6, one end of the stop protrusion 2231 stretches to one side of the linkage arm 224, such that the stop protrusion 2231 is connected with the mounting clearance 2243, a first mounting slot 2431 is provided on the mounting cylinder 243, one end of the first upper arm 2241 that is away from the lockup portion 223 and one end of the first lower arm 2242 that is away from the lockup portion 223 are provided with a second connecting hole 22411 and a third connecting hole 22421 in respective, the torsional spring ring 2223 is worn between the second connecting hole 22411 and the third connecting hole 22421, and the first upper arm 2241, first lower arm 2242 and first elastic member 222 are worn on the second moving shaft 242 through the second connecting hole 22411, third connecting hole 22421 and torsional spring ring 2223; the second connecting arm 2222 is plugged in the first mounting slot 2431, the first connecting arm 2221 passes through the mounting clearance 2243 and abuts against the stop protrusion 2231, wearing the torsional spring ring 2223, second connecting hole 22411 and third connecting hole 22421 on the second moving shaft 242 together enables the first elastic member 222 and the lockup member 22 to be coaxial, that is, the axial rotation of the lockup member 22 along the second moving shaft 242 is achieved, and thus the free stretching of the stop protrusion 2231 can be achieved; the first elastic member 222 plays a role in resetting the stop protrusion 2231, such that the stop protrusion 2231 can keep stretching out of an axis protection direction of the first connecting hole 211, and the stop protrusion 2231 can abut against the lock pin 12 when the lock pin 12 is plugged; and three sets of lockup members 22 are provided in this embodiment, that is, after the lock pin 12 is plugged, the stop protrusions 2231 of the three sets of lockup members 22 will abut against the lock pin 12 in three directions, and hold the lock pin 12 in three directions.

Figure 4:
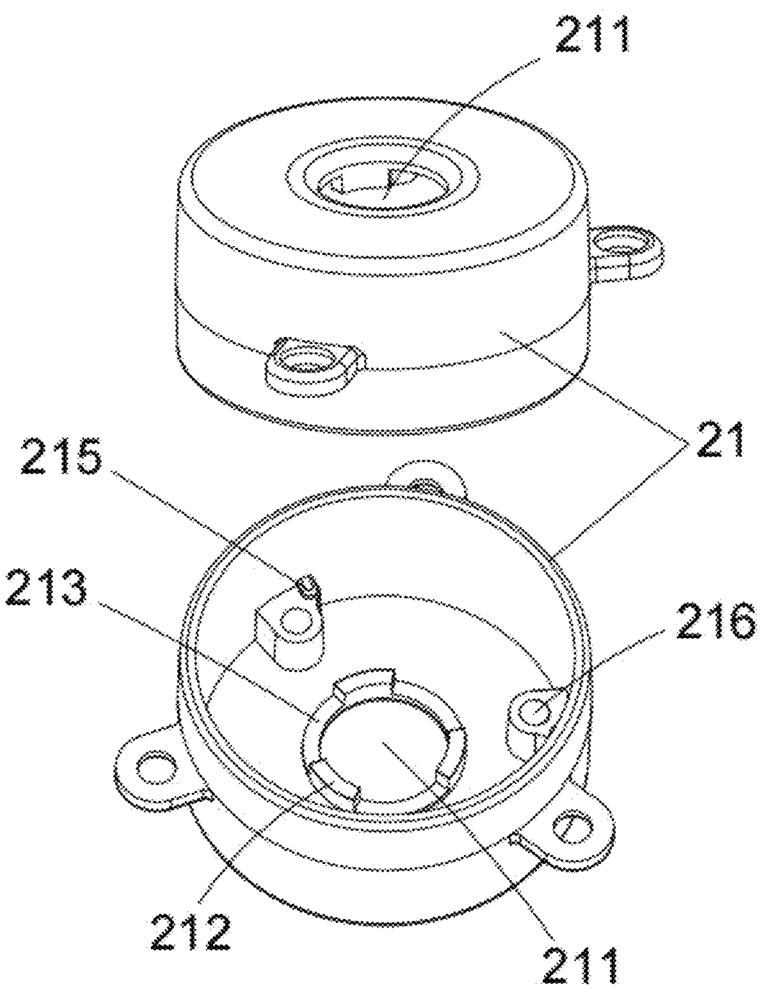
FIG. 4 is a result diagram of a lock body housing according to the present disclosure.

To achieve the cooperation of the stop protrusion 2231 and the locking slot body 122, in this embodiment, the stop protrusion 2231 matches with the locking slot body 122 in size. As shown in FIG. 9, upward stretching is carried out around the second through hole 241 to form a first limiting edge 245 for limiting the lockup member 22, and a second mounting slot 2451 that passes through the stop protrusion 2231 is provided on the first limiting edge 245. Further, as shown in FIG. 4, stretching in the lock body housing 21 around the first connecting hole 211 forms a second limiting edge 212, a third mounting slot 213 is provided on the second limiting edge 212, the second limiting edge 212 fits with the first limiting edge 245 in position and abuts against each other, such that the second mounting slot 2451 communicates with the third mounting slot 213 to form a passage, into which the stop protrusion 22321 can stretch. The second limiting edge 212 abuts against the first limiting edge 245 to constitute a closed limiting structure, which can effectively limit the lockup member 22, thus not affecting the lockup action to the lock pin 12 due to skipping when subjected to an external collision; and the second mounting slot 2451 and the third mounting slot 213 form the passage of the stop protrusion 2231, to ensure the normal lockup action to the lock pin 12 by the lockup member 22.

As shown in FIG. 9, the other end of the fixed member 24 that is relative to the lockup member 22 is provided with a first moving shaft 246, and the moving member 23 is sleeved on the first moving shaft 246. As shown in FIG. 3 and FIG. 10, a first adsorption member 232 capable of adsorbing in cooperation with a magnetic force is fixedly connected to the moving member 23, a side wing of the moving member 23 is provided with a connecting lug 233, a fourth connecting hole 2331 is provided on the connecting lug 233, and the fourth connecting hole 2331 is worn on the first moving shaft 246; a second elastic member 247 is provided on the first moving shaft 246, the second elastic member 247 is a buffer spring or other buffer components, the other end of the moving member 23 that is in relative to the snap pin 231 is provided with a first mounting cavity 234, the first absorption member 232 is disposed in the first mounting cavity 234, outward raising is carried out around the first mounting cavity 234 to form a protection edge 2341, the protection edge 2341 is slightly higher than the first absorption member 232, and a first opening 2342 is provided on the protection edge 2341. Mounting the first absorption member 232 in the first mounting cavity 234 can ensure that the moving member 23 can move with the attraction to the first absorption member 232 by the first magnetic body 13/second magnetic body 31, and ensure the lockup operation to the lockup member 22 by the moving member 23, and arranging the first opening 2342 can facilitate the mounting and disassembly of the first absorption member 232.

To protect and cooperate the mounting of various assemblies, the lock body housing 21 in this embodiment further includes a lock body rear cover 214 and a first fixed screw 5, a first fixed cylinder 2141 is provided on the lock body rear cover 214, the first fixed cylinder 2141 is a hollow cylinder, a first mounting hole 216 fitting with the first fixed cylinder 2141 is provided on an inner wall of the lock body housing 21, a second mounting hole 248 fitting with the first fixed cylinder 2141 is provided on the fixed member 24, and after passing through the second mounting hole 248, the first fixed cylinder 2141 is connected with the first mounting hole 216 through the first fixed screw 5. The first fixed cylinder 2141 provided on the lock body rear cover 214 can limit the moving member 23 and fix the fixed member 24, to ensure the assembly stability of the moving member 23 and the fixed member 24, and avoid the influence from an external force.

Specifically, an inner groove 235 fitting with the first fixed cylinder 2141 is disposed around the moving member 23, and the moving member 23 is clamped between the lock body rear cover 214 and the fixed member 24 through the inner groove 235. The moving member 23 can be limited between the first fixed cylinders 2141 by arranging the inner groove 235, and left and right limiting actions are formed for the moving member 23 under a premise of not affecting the axial movement of the moving member 23.

Further, the first absorption member 232 is a magnet, a permanent magnet or other magnetic members with magnetism, and the other end of the lock body rear cover 214 that is relative to the first fixed cylinder 2141 is provided with a second absorption member 4; in this embodiment, the second absorption member is an iron sheet, certainly may also be other metal sheets; and when not working, the second absorption member 4 disposed on the lock body rear cover 214 can fit with the first absorption member 232 to absorb the moving member 23 to be away from the fixed member 24, such that the moving member 23 will not lock the lockup member 22, facilitating the plugging of the lock pin 12. The other end of the lock body rear cover 214 that is in relative to the first fixed cylinder 2141 is provided with a fourth mounting slot 2142, a clamping member 2143 is provided around the fourth mounting slot 2142, and the second absorption member 4 is mounted in the fourth mounting slot 2142 through the clamping member 2143. The second absorption member 4 is mounted on the lock body rear cover 214 through the clamping member 2143, facilitating the mounting and disassembly of the second absorption member 4.

Further, a positioning bump 215 is provided inside the lock body housing 21, and a positioning slot 249 fitting with the positioning bump 215 is provided on the fixed member 24. When in assembly, further limiting of the fixed member 24 can be achieved, to avoid the shaking of the fixed member 24 affecting the lockup operation.

Figure 12:
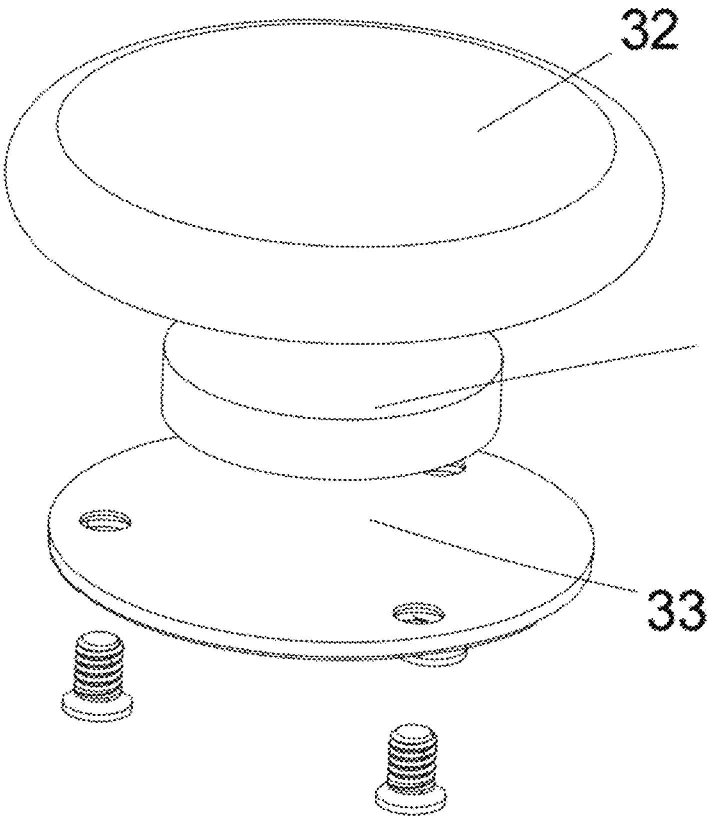
FIG. 12 is a structural schematic diagram of a key assembly according to the present disclosure.
Figure 13:
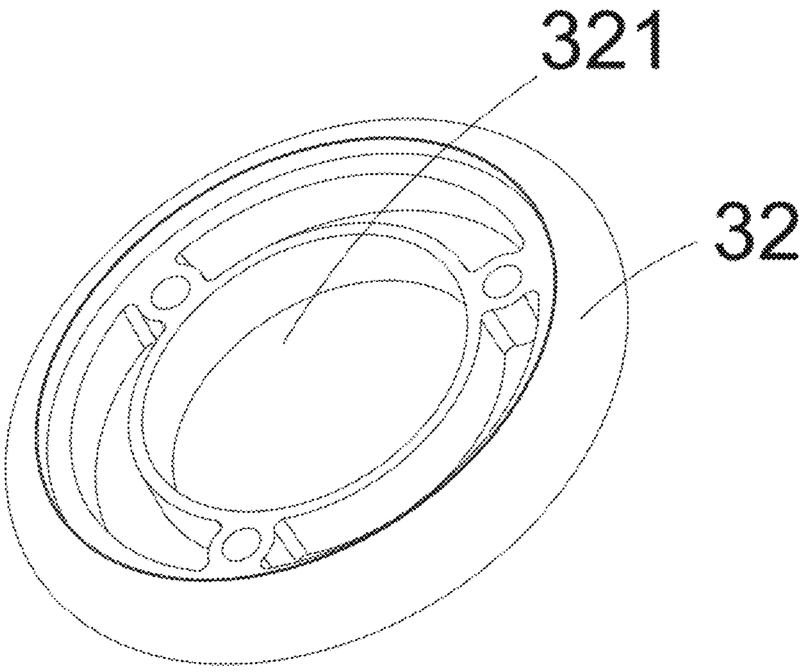
FIG. 13 is a structural schematic diagram of a key housing according to the present disclosure.

As shown in FIG. 12 and FIG. 13, a second magnetic body 31 is provided on the key assembly 3, a magnetic force of the second magnetic body 31 is greater than that of the first magnetic body 13, the key assembly 3 includes a key housing 32 and a key outer cover 33 that are in removable connection, a third mounting cavity 321 is formed on the key housing 32, and the second magnetic body 31 is mounted in the third mounting cavity 321, which facilitates the mounting and disassembly of the second magnetic body 31.

Figure 14:
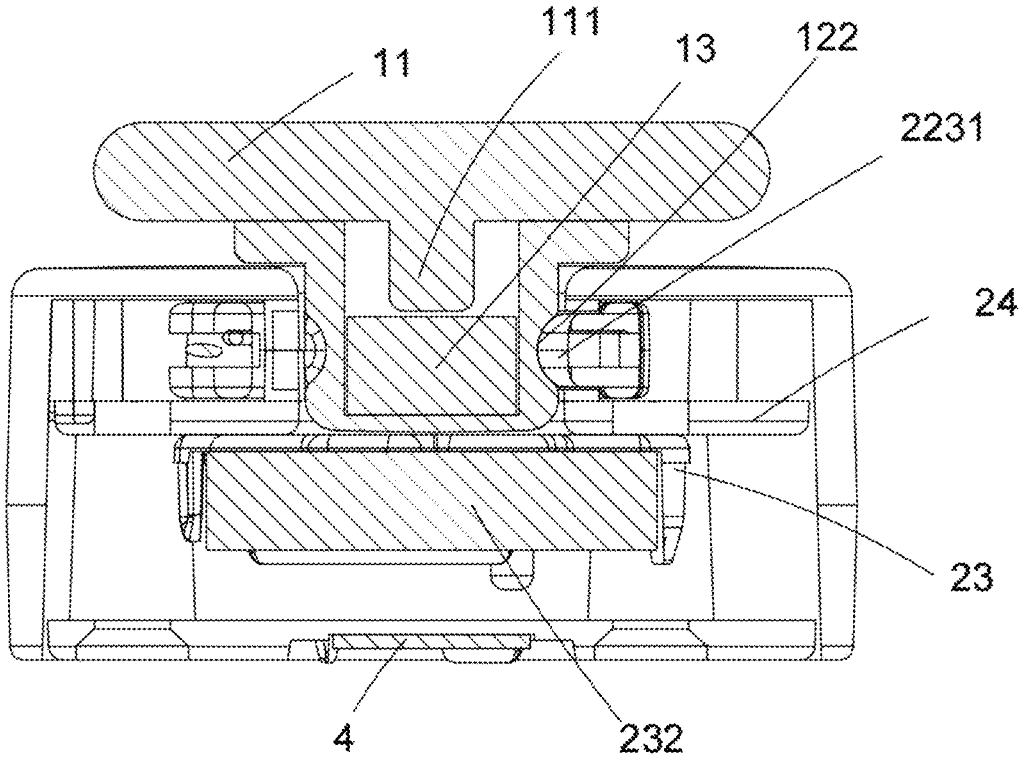
FIG. 14 is an assembly schematic diagram of a lock pin assembly and a lock body according to the present disclosure.

Description for the working principles of the present disclosure: when in use, as shown in FIG. 14, only the lock pin 12 of the lock pin assembly 1 is plugged in the first connecting hole 211, the stop protrusion 2231 will be resisted back to the inside of the lock body housing 21 during the plugging of the lock pin 12 until the lock pin 12 is completely pressed into the first connecting hole 211, and at this time the locking slot body 122 is just placed on the assembly position with the stop protrusion 2231; the stop protrusion 2231 will abut against the locking slot body 122 under the action of the first elastic member 222, meanwhile the first magnetic body 13 mounted in the lock pin 12 is closer and closer to the position of the first absorption member 232 in the moving member 23 with the plugging of the lock pin 12, and the first magnetic body 13 will absorb the first absorption member 232 when reaching the action range of the magnetic force; since the lock pin assembly 1 is fixed after being plugged, the first absorption member 232 drives the moving member 23 to move in the direction of the first magnet until the moving member 23 fits with the fixed member 24, at this time the snap pin 231 arranged on the moving member 23 will pass through the first through hole 244 with the movement of the moving member 23, then plugged into the first lockup holes 2232 on the lockup member 22, at this time the lockup member 22 cannot move due to the blocking of the snap pin 231, such that the stop protrusion 2231 keeps a state of tightly abutting against the locking slot body 122, thus achieving the lockup action to the lock pin assembly 1;

Unlocking action: when in use, the key assembly 3 is only needed to approach to the end part of the lock body 2 outer cover, since the magnetic force of the second magnetic body 31 is greater than that of the first magnetic body 13, when the key assembly 13 is approaching, the second magnetic body 31 will attract the first absorption member 232, the first absorption member 232 will drive the moving member 23 to move in the direction of the lock body 2 outer cover, then the snap pin 231 is separated from the first lockup hole 2232, and at this time the lockup member 22 can rotate along the first moving shaft 246 without the blocking of the snap pin 231, and the lock pin assembly 1 can be pulled out at will, to complete the unlocking action.

The above are only preferred embodiments of the present disclosure and not intended to limit the present disclosure. Any modifications, equivalent replacements, improvements and the like made within the spirit and principle of the present disclosure shall fall within the protection scope of the present disclosure.

What is claimed is:

1. A hidden magnetic control lock, comprising:

a lock pin assembly (1), wherein the lock pin assembly (1) comprises a lock pin base (11), the lock pin base (11) is connected with a lock pin (12), and a first magnetic body (13) is provided on the lock pin (12);

a lock body (2), wherein the lock body (2) comprises a lock body housing (21), a lockup member (22), a moving member (23) and a fixed member (24) fixedly connected in the lock body housing (21), a first connecting hole (211), in which the lock pin (12) is plugged, is provided on the lock body housing (21), the lockup member (22) is stretchably mounted on the fixed member (24), and the lockup member (22) is disposed below the first connecting hole (211) and abuts against the plugged lock pin (12); and the other end of the fixed member (24) that is relative to the lockup member (22) is provided with a first moving shaft (246), the moving member (23) is sleeved on the first moving shaft (246), a first adsorption member (232) capable of adsorbing in cooperation with a magnetic force is fixedly connected to the moving member (23), and the moving member (23) and the lockup member (22) are provided with locking structures that cooperate with each other; and a key assembly (3), wherein a second magnetic body (31) is provided on the key assembly (3), and a magnetic force of the second magnetic body (31) is greater than that of the first magnetic body (13).

2. The hidden magnetic control lock according to claim 1, wherein each of locking structure comprises a snap pin (231) provided on the moving member (23), and a first lockup hole (2232) provided on the lockup member (22); and the snap pin (231) cooperates with the first lockup hole (2232) to lock the lockup member (22).

3. The hidden magnetic control lock according to claim 2, wherein a first through hole (244), passing through the snap pin (231), is provided on the fixed member (24).

4. The hidden magnetic control lock according to claim 2, wherein the lockup member (22) comprises a first elastic member (222) as well as a lockup portion (223) and a linkage arm (224) that are connected in turn, the first lockup hole (2232) is provided on the lockup portion (223), a joint between the lockup portion (223) and the linkage arm (224) is provided with a stop protrusion (2231), the first elastic member (222) is provided on the linkage arm (224), a second moving shaft (242) is provided on the fixed member (24), and one side of the linkage arm (224) that is away from the lockup portion (223) is sleeved on the second moving shaft (242).

5. The hidden magnetic control lock according to claim 4, wherein the linkage arm (224) comprises a first upper arm (2241) and a first lower arm (2242), a mounting clearance (2243) is provided between the first upper arm (2241) and the first lower arm (2242), one end of the first elastic member (222) is mounted on the mounting clearance (2243), a mounting cylinder (243) is provided on the fixed member (24), and the other end of the first elastic member (222) is connected with the mounting cylinder (243).

6. The hidden magnetic control lock according to claim 5, wherein the first elastic member (222) comprises a first connecting arm (2221), a second connecting arm (2222) and a torsional spring ring (2223) connected with the first connecting arm (2221) and the second connecting arm (2222), one end of the stop protrusion (2231) extends to one side of the linkage arm (224) such that the stop protrusion (2231) is connected with the mounting clearance (2243), a first mounting slot (2431) is provided on the mounting cylinder (243), one end of the first upper arm (2241) that is away from the lockup portion (223) and one end of the first lower arm (2242) that is away from the lockup portion (223) are provided with a second connecting hole (22411) and a third connecting hole (22421) in respective, the torsional spring ring (2223) is worn between the second connecting hole (22411) and the third connecting hole (22421), and the first upper arm (2241), first lower arm (2242) and first elastic member (222) are worn on the second moving shaft (242) through the second connecting hole (22411), third connecting hole (22421) and torsional spring ring (2223); and the second connecting arm (2222) is plugged into the first mounting slot (2431), and the first connecting arm (2221) passes through the mounting clearance (2243) and abuts against the stop protrusion (2231).

7. The hidden magnetic control lock according to claim 6, wherein a second through hole (241) that fits with the first connecting hole (211) in position is provided on the fixed member (24), upward stretching is carried out around the second through hole (241) to form a first limiting edge (245) for limiting the lockup member (22), and a second mounting slot (2451) that passes through the stop protrusion (2231) is provided on the first limiting edge (245).

8. The hidden magnetic control lock according to claim 4, wherein the lock pin (12) stretches downward to form a locking portion (121), an indented locking slot body (122) is provided on the lockup portion (121), and the size of the locking slot body (122) fits with the stop protrusion (2231).

9. The hidden magnetic control lock according to claim 1, wherein the lock body housing (21) further comprises a lock body rear cover (214) and a first fixed screw (5), a first fixed cylinder (2141) is provided on the lock body rear cover (214), the first fixed cylinder (2141) is a hollow cylinder, a first mounting hole (216) fitting with the first fixed cylinders (2141) is provided on an inner wall of the lock body housing (21), a second mounting hole (248) fitting with the first fixed cylinder (2141) is provided on the fixed member (24), after passing through the second mounting hole (248), the first fixed cylinder (2141) is connected with the first mounting hole (216) through the first fixed screw (5), and the other end of the lock body rear cover (214) that is relative to the first fixed cylinder (2141) is provided with a second absorption member (4).

10. The hidden magnetic control lock according to claim 2, wherein a side wing of the moving member (23) is provided with a connecting lug (233), a fourth connecting hole (2331) is provided on the connecting lug (233), and the fourth connecting hole (2331) is worn on the first moving shaft (246).

11. The hidden magnetic control lock according to claim 10, wherein the other end of the moving member (23) that is in relative to the snap pin (231) is provided with a first mounting cavity (234), the first absorption member (232) is disposed in the first mounting cavity (234), outward raising is carried out around the first mounting cavity (234) to form a protection edge (2341), the protection edge (2341) is slightly higher than the first absorption member (232), and a first opening (2342) is provided on the protection edge (2341).

12. The hidden magnetic control lock according to claim 10, wherein a second elastic member (247) is provided on the first moving shaft (246).

13. The hidden magnetic control lock according to claim 3, wherein sections of the first lockup hole (2232), snap pin (231) and first through hole (244) are all square, inlet ends of the first lockup hole (2232) and the first through hole (244) are provided with a first circular arc introduction portion (22321) and a second circular arc introduction portion (2441) in respective, an end part of the snap pin (231) is provided with an upward protrusion portion (2311), and the protrusion portion (2311) is a circular arc protrusion.

14. The hidden magnetic control lock according to claim 7, wherein stretching in the lock body housing (21) around the first connecting hole (211) forms a second limiting edge (212), a third mounting slot (213) is provided on the second limiting edge (212), the second limiting edge (212) fits with the first limiting edge (245) in position and abuts against each other, such that the second mounting slot (2451) communicates with the third mounting slot (213) to form a passage, into which the stop protrusion (22321) stretches.

15. The hidden magnetic control lock according to claim 9, wherein an inner groove (235) fitting with the first fixed cylinder (2141) is disposed around the moving member (23), and the moving member (23) is clamped between the lock body rear cover (214) and the fixed member (24) through the inner groove (235).

16. The hidden magnetic control lock according to claim 9, wherein the other end of the lock body rear cover (214) that is in relative to the first fixed cylinder (2141) is provided with a fourth mounting slot (2142), a clamping member (2143) is provided around the fourth mounting slot (2142), and the second absorption member (4) is mounted in the fourth mounting slot (2142) through the clamping member (2143).

17. The hidden magnetic control lock according to claim 1, wherein the first absorption member (232) is a magnet.

18. The hidden magnetic control lock according to claim 1, wherein a positioning bump (215) is provided inside the lock body housing (21), and a positioning slot (249) fitting with the positioning bump (215) is provided on the fixed member (24).

19. The hidden magnetic control lock according to claim 1, wherein a second mounting cavity (123) is arranged in the lock pin (12), and the first magnetic body (13) is mounted in the second mounting cavity (123).

20. The hidden magnetic control lock according to claim 1, wherein the key assembly (3) comprises a key housing (32) and a key outer cover (33) that are in removable connection, a third mounting cavity (321) is formed on the key housing (32), and the second magnetic body (31) is mounted in the third mounting cavity (321).

* * * * *